United States Patent [19]
Liljekvist et al.

[11] 4,228,863
[45] Oct. 21, 1980

[54] REAMER BIT FOR RAISE BORING

[75] Inventors: Bernt S. Liljekvist; Anders E. Persson, both of Sandviken, Sweden

[73] Assignee: Sandvik Aktiebolag, Sandviken, Sweden

[21] Appl. No.: 939,221

[22] Filed: Sep. 5, 1978

[30] Foreign Application Priority Data

Sep. 9, 1977 [SE] Sweden ............................. 7710129

[51] Int. Cl.$^2$ ............................................. E21B 9/22
[52] U.S. Cl. ................................. 175/344; 175/53; 175/361
[58] Field of Search ................. 175/53, 320, 335, 340, 175/344, 406; 285/189; 403/360, 361

[56] References Cited

U.S. PATENT DOCUMENTS

| | | | |
|---|---|---|---|
| 3,191,936 | 6/1965 | Guier | 403/361 X |
| 3,512,808 | 5/1970 | Graham | 285/189 |
| 3,857,642 | 12/1974 | Miller | 403/361 X |
| 3,917,009 | 11/1975 | Dyer et al. | 175/53 |
| 4,007,799 | 2/1977 | Dixon et al. | 175/340 |
| 4,011,019 | 3/1977 | McDonald et al. | 175/53 X |

*Primary Examiner*—James A. Leppink
*Attorney, Agent, or Firm*—Burns, Doane, Swecker & Mathis

[57] ABSTRACT

A reamer bit for raise boring in rock, of the type comprising a body on which a number of rolling cutters with cutting inserts are rotatably mounted for contact with and disintegration of the rock, and a detachable stem mounted in a central bore on the body and adapted to be received in a pilot hole drilled in advance in the rock. The stem has two cylindrical portions, an upper one of which having a smaller diameter than a lower one thereof. The bore in the body has corresponding upper and lower cylindrical portions surrounding the stem. The upper cylindrical portions of the body and the stem define upper stem restraining surface means. The lower cylindrical portions of the body and the stem define lower stem restraining surface means. The stem at its lower portion is provided with a flange abutting the body from below and supporting it axially. The upper and lower restraining surface means together comprise a substantial axial portion of the part of the stem that is surrounded by the bore. The corresponding surrounding portions of the bore in the body form a close fit with the cylindrical portions on the stem.

7 Claims, 2 Drawing Figures

4,228,863

REAMER BIT FOR RAISE BORING

BACKGROUND AND OBJECTS OF THE INVENTION

Reamer bits for raise boring operations are used for drilling a raise by reaming a pilot hole to the desired final diameter. The drill bit is usually composed of a number of rolling cutters which are arranged in an annular pattern on a raise bit body and are rotated at the same time as the bit is fed upwardly, thus disintegrating the rock around the pilot hole. During the drilling the stem is located in the pilot hole, which has been drilled in advance, and for this reason should have a diameter closely matching the pilot hole. When changing the diameter of the pilot hole and repairing the stem or the bit, it is desirable that the stem be easily detachable and replaceable by a new stem of the same or of a different dimension and that this can be done at the working site by simple hand tools. Also, for transport reasons it is desirable that the stem be detachable.

From U.S. Pat. No. 3,993,147 it is known to provide raise bits with a detachable stem of the above type. The detachable connection disclosed in that patent has, however, been found to have the disadvantage that it is difficult to loosen after drilling for some time, as have other similar connections of a conical type. The effort to loosen the stem is time consuming and must moreover be performed by means of special tools such as hydraulic presses and similar devices.

Considering this background, it is a primary object of the invention to provide a raise bit with a detachable stem which satisfies the requirement of an easily detachable connection between the stem and the bit and also allows a precise fit between the stem and the rest of the bit.

BRIEF SUMMARY OF THE INVENTION

These objects are achieved by the present invention wherein a reamer bit for raise boring in rock comprises a body on which a number of rolling cutters with cutting inserts are rotatably mounted for contact with and disintegration of the rock, and a detachable stem mounted in a central bore on the body and adapted to be received in a pilot hole drilled in advance in the rock. The stem has two cylindrical portions, an upper one of which having a smaller diameter than a lower one thereof. The bore in the body has corresponding upper and lower cylindrical portions surrounding the stem. The upper cylindrical portions of the body and the stem define upper stem restraining surface means, and the lower cylindrical portions of the body and the stem define lower stem restraining surface means. The stem at its lower portion is provided with a flange abutting the body from below and supporting it axially. The upper and lower restraining surface means together comprise a substantial axial portion of the part of the stem that is surrounded by the bore. The corresponding surrounding portions of the bore in the body form a close fit with the cylindrical portions on the stem.

THE DRAWING

A preferred form of the invention is described in detail in the following text with reference to the accompanying drawings, wherein:

FIG. 1 is an axial sectional view taken through a reamer bit for raise drilling according to the invention, and FIG. 2 is a partial section on a larger scale of the central part of the drill bit depicted in FIG. 1.

DETAILED DESCRIPTION OF A PREFERRED EMBODIMENT OF THE INVENTION

Figure 1:
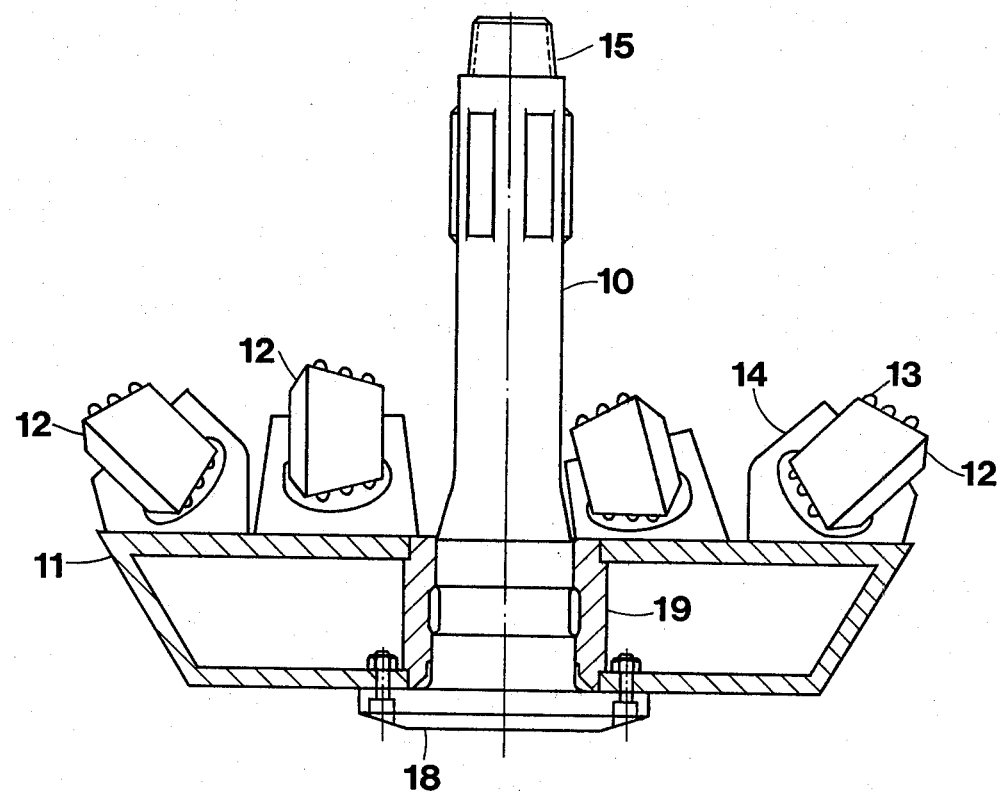
Figure 2:
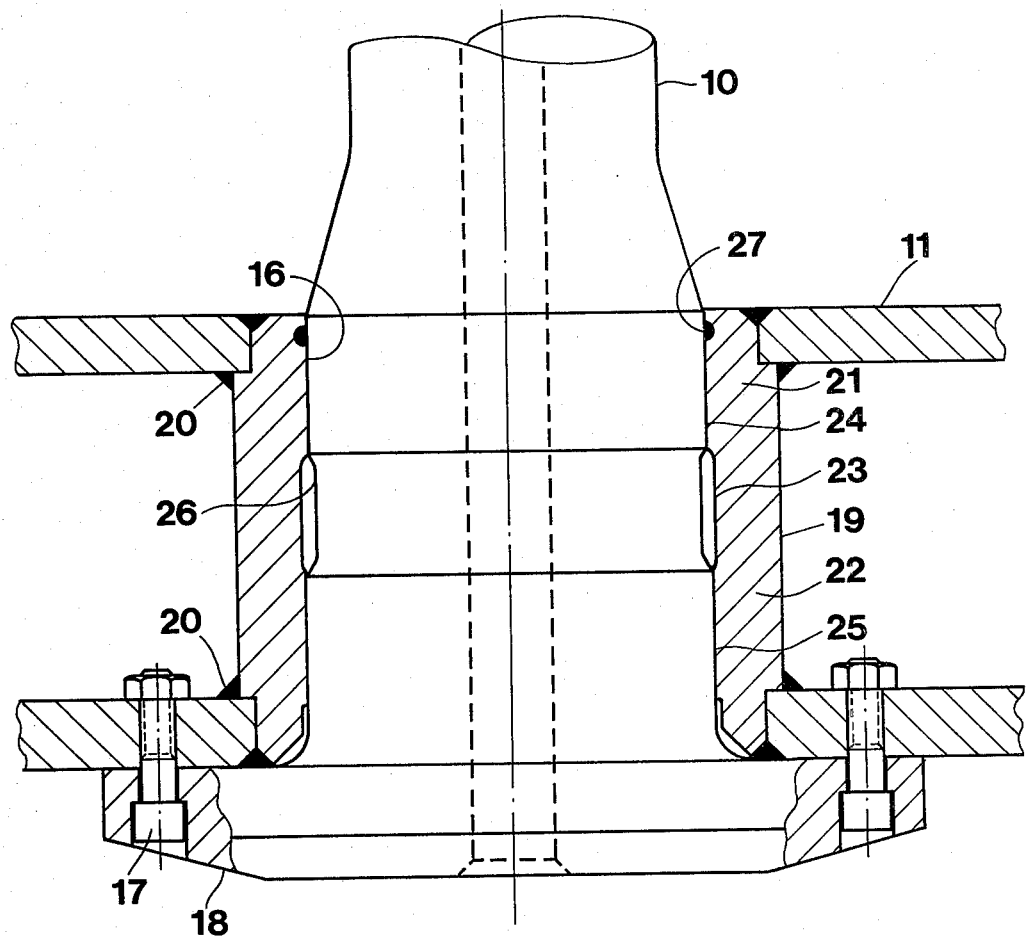

The preferred equipment for raise drilling shown in FIG. 1 comprises a central pilot lug or stem 10 around which rolling cutters 12 are rotatably mounted on a drill bit body 11. The mantle surface of the cutters is conical and is provided with cutting inserts 13 of sintered hard metal or some other wear resistant material. The cutters 12 are journalled on stationary cylindrical shafts which are mounted in saddles 14 attached to the bit body 14 in conventional fashion. The upper end of the stem is provided with a conical thread 15 which can be used for coupling the stem 10 to a drill rod used for driving the raise bit.

The stem 10 extends through a central opening 16 in the body 11. The end of the stem 10 located opposite the threaded end is provided with a flange portion 18 which, by means of bolts 17, is fastened to the body from below. The portion of the stem that is situated within the body is enclosed by a sleeve which by means of welds 20 is fastened to the body 11 and forms the central bore thereof.

The sleeve 19 comprises an upper portion 21 and a lower portion 22 and an intermediate portion that forms an internal relief 23. The internal diameter of the upper portion 21 of the sleeve is somewhat smaller than the diameter of the lower portion 22. The part of the stem 10 that is situated within the sleeve has, in a corresponding way, two cylindrical portions 24 and 25 with their external diameters selected in such a way that a close slide fit is obtained in relation to the sleeve portions 21 and 22, respectively. The cylindrical portion 25 does not require as precise a fit in its associated sleeve portion 22 as does the cylindrical portion 24 in its associated sleeve portion 21 for obtaining a fully satisfactory stability of the assembly. The stem 10 has, in the same way as the sleeve 19, a relief portion 26 between the two portions 24 and 25 of different diameters.

As a practical example of dimensions of the stem, the upper portion 24 may have a diameter of 340 mm, the lower portion 25 being 342 mm, the difference thus being 2 mm. The purpose of this arrangement is to lessen the risk of jamming between the stem and the bit body during assembly and disconnection.

The flange 18 on the stem serves to carry the bit 11 in the axial direction on the stem 10. Interfaces between the cylindrical portions on the stem and the matching portions in the bore 16 on the bit form upper and lower restraining surface portions which serve to hold the bit and the stem in alignment and counteract the tilting forces acting on the bit during drilling due to uneven contact pressure between the bit and the rock. The fit between the stem and the bore should therefore be tight enough not to allow tilting of the bit body on the stem. At the same time, the fit should allow relative sliding in order to facilitate assembly and separation of the two parts. The bolts 17 contribute in counteracting tilting.

In order to strengthen the alignment effect between the restraining surfaces it is suitable that they have a combined axial length (i.e., 21 plus 22, or 24 plus 25) that comprises a substantial part of the portion of the stem that is surrounded by the bore. Suitably, they comprise together at least half of such portion. The upper and lower cylindrical portions can suitably be of approximately equal length.

In order to avoid the intrusion of cuttings between the cylindrical surfaces, which may obstruct disconnection and assembly, there is provided a seal 27 adjacent the top of the upper cylindrical surfaces.

By the above-described design, there is obtained a raise bit in which the stem can be easily detached by means of simple tools. The detaching requires only removal of the bolts 17. The simple construction moreover allows a more economical production than before.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. In a reamer bit for raise boring in rock, of the type comprising a body on which a number of rolling cutters with inserts are rotatably mounted for contact with and disintegration of the rock, and a detachable stem mounted in a central bore on the body and adapted to be received in a pilot hole drilled in advance in the rock, said stem having two cylindrical portions, an upper one of which having a smaller diameter than a lower one thereof, said bore in the body having corresponding upper and lower cylindrical portions surrounding the stem, the interface between said upper cylindrical portions of said body and said stem defining upper stem restraining surface means, and the interface between said lower cylindrical portions of said body and said stem defining lower stem restraining surface means, the improvement wherein the stem is provided with a flange located below said lower restraining surface means, said flange abutting the body from below and providing substantially all axial support for said body, means releasably connecting said flange to said body, said upper and lower restraining surface means together comprising a substantial axial portion of that part of the stem surrounded by the bore, the corresponding surrounding portions of the bore in the body forming a close fit with the cylindrical portions of the stem, said upper and lower restraining surface means being separated by an annular relief portion on at least one of said stem and body, the diameter of the portion of said stem located at an upper end of said relief portion being no larger than the diameter of said upper cylindrical portion of said stem.

2. A reamer bit as defined in claim 1, wherein the lengths of said upper and lower restraining surface means are approximately equal.

3. A reamer bit as defined in claim 1, wherein the combined axial length of said upper and lower restraining surface means comprises more than half of the axial length of the part of the stem that is surrounded by the bore.

4. A reamer bit as defined in claim 3, wherein the lengths of said upper and lower restraining surface means are approximately equal.

5. A reamer bit as defined in claim 3, wherein a relief portion is formed in said stem and in said body.

6. A reamer bit as defined in claim 5, including a seal disposed between the upper cylindrical portions of the stem and the bore.

7. A reamer bit as defined in claim 6, wherein said flange is connected to said body by fasteners extending therethrough.

* * * * *